Nov. 1, 1932.  M. B. HAMMOND  1,885,435
BUMPER FOR VEHICLES
Filed Nov. 25, 1931

Witness:

Inventor
Milton B. Hammond
By Rice and Rice
Attorneys

Patented Nov. 1, 1932

1,885,435

UNITED STATES PATENT OFFICE

MILTON B. HAMMOND, OF GRAND RAPIDS, MICHIGAN, ASSIGNOR TO WOLVERINE BUMPER & SPECIALTY COMPANY, OF GRAND RAPIDS, MICHIGAN, A CORPORATION OF MICHIGAN

BUMPER FOR VEHICLES

Application filed November 25, 1931. Serial No. 577,273.

The present invention relates to bumpers for vehicles, as automobiles and the like; and its object is to provide such a bumper having an impact bar cross-sectionally convex forwardly and concave rearwardly and of elliptical cross-sectional form; and further, to provide covering members for the ends of such an impact bar having means for securing these parts on the mounting means of the bumper.

This and any other objects hereinafter appearing are attained by, and the invention finds preferable embodiment in, the bumper structure particularly described in the body of this specification and illustrated by the accompanying drawing, in which.

Figure 1:
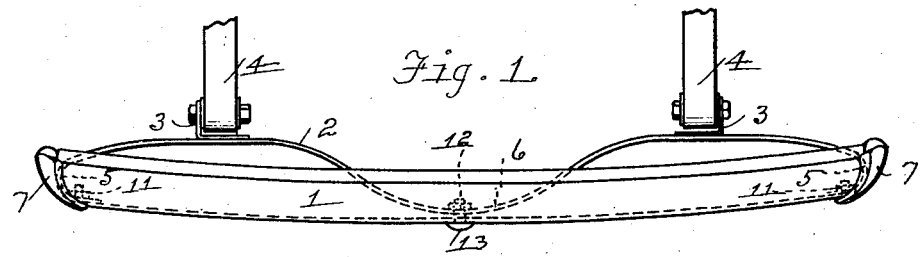
Figure 1 is a top plan view of a bumper and means for mounting the same on an automobile.
Figure 2:
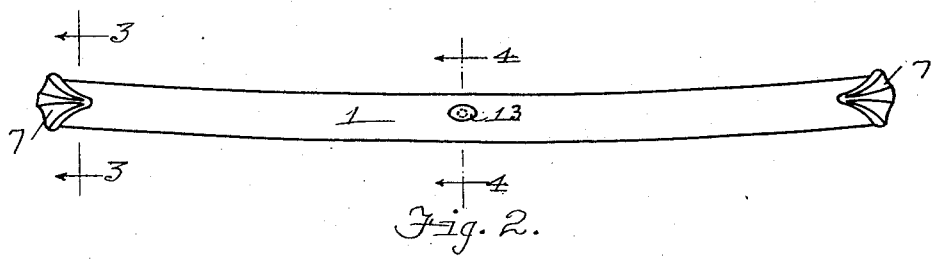
Figure 2 is a front view thereof.

In the drawing is shown a bumper comprising a front or impact bar 1 and a resilient rear bar 2 provided with suitable means, as the brackets 3, for mounting the bumper on portions 4 of an automobile.

Figure 3:
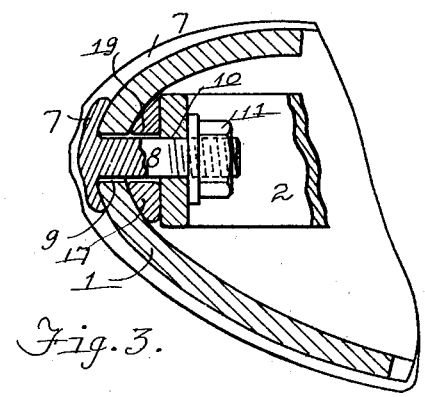
Figure 3 is a vertical sectional view of the same taken on line 3—3 of Figure 2.
Figure 4:
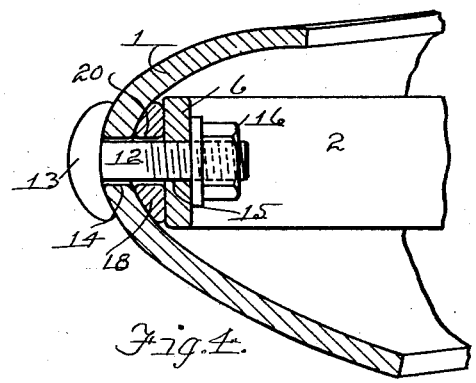
Figure 4 is a central vertical sectional view of the same taken on line 4—4 of Figure 2.

This impact bar is cross-sectionally convex forwardly and concave rearwardly, such cross-sectional form being preferably an arc of an ellipse as shown in Figures 3 and 4. The ends 5 of the resilient rear bar are preferably curved forwardly and then toward each other and said bar's middle portion 6 is bowed forwardly as shown in Figure 1.

End members 7 are concaved to fit over the ends of the impact bar and have means for securing these end members and said bar on the ends of the resilient rear bar 2, such means preferably being the bolt portions 8 of these end members, desirably integral therewith, which extend through openings 9 in the impact bar and openings 10 in the ends 5 of the rear bar and are threaded for securing nuts 11.

A bolt 12 having a head 13 passes through openings 14, 15 in the middle of both bars 1 and 2 is likewise threaded for a nut 16 for securing these bars together.

The elliptical cross-sectional form of the impact bar and the securing thereof to the rear bar at the vertex of the elliptical arc of the impact bar (as shown in Figures 3 and 4) adds to the bumper's strength for resisting thrusts in the automobile's longitudinal direction.

Filler pieces 17, 18 shaped correspondingly with the adjacent faces of the bars 1, 2 and having holes 19, 20 through which the bolts 8, 12 extend are desirably provided.

The invention being intended to be pointed out in the claims, is not to be limited to or by details of construction of the particular embodiment thereof illustrated by the drawing or hereinbefore described.

I claim:

1. A bumper for vehicles comprising: an impact bar cross-sectionally convex forwardly and concave rearwardly; inwardly-concave end members fitting over the ends of said bar and having means extending therethrough for connecting said bar and said end members with the vehicle.

2. A bumper for vehicles comprising: a resilient rearward bar mounted on the vehicle having end portions curved forwardly and toward each other; a forward impact bar cross-sectionally convex forwardly and concave rearwardly; inwardly-concave end members fitting over the ends of the impact bar and having means extending therethrough for securing the same and said end members on the ends of said rearward bar.

3. A bumper for vehicles comprising: a resilient rearward bar having forwardly extending middle and end portions and mounted intermediate its middle portion and end portions on the vehicle; a forward impact bar cross-sectionally convex forwardly and concave rearwardly; inwardly-concave end members fitting over the ends of the impact bar and having bolt portions formed integrally therewith extending through the impact bar for securing the same and said end members on the end portions of the rearward bar.

4. A bumper for vehicles comprising: a resilient rearward bar having forwardly extending middle and end portions and mounted intermediate its middle fortion and end portions on the vehicle; a forward impact bar cross-sectionally convex forwardly and concave rearwardly; inwardly-concave end members fitting over the ends of the impact bar and having bolt portions formed integrally therewith extending through the impact bar for securing the same and said end members on the end portions of the rearward bar; a headed bolt extending through the impact bar for securing the same to the middle portion of the rearward bar.

In testimony whereof I have hereunto set my hand at Grand Rapids, Michigan, this 23rd day of November, 1931.

MILTON B. HAMMOND.